United States Patent
Fukasawa

(10) Patent No.: US 12,166,411 B2
(45) Date of Patent: Dec. 10, 2024

(54) CONTROL DEVICE FOR CONTROLLING AN OUTPUT VOLTAGE OF A POWER CONVERTER

(71) Applicant: TMEIC Corporation, Chuo-ku (JP)

(72) Inventor: Issei Fukasawa, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 109 days.

(21) Appl. No.: 17/756,330

(22) PCT Filed: Nov. 13, 2020

(86) PCT No.: PCT/JP2020/042507
§ 371 (c)(1),
(2) Date: May 23, 2022

(87) PCT Pub. No.: WO2022/102099
PCT Pub. Date: May 19, 2022

(65) Prior Publication Data
US 2022/0416648 A1 Dec. 29, 2022

(51) Int. Cl.
*H02M 1/32* (2007.01)
*H02M 1/00* (2006.01)

(52) U.S. Cl.
CPC ........... *H02M 1/32* (2013.01); *H02M 1/0012* (2021.05)

(58) Field of Classification Search
CPC .............................. H02M 1/32; H02M 1/0012
See application file for complete search history.

(56) References Cited

U.S. PATENT DOCUMENTS

| 2016/0204691 A1* | 7/2016 | Okuda | H02M 3/04 363/55 |
| 2017/0244314 A1* | 8/2017 | Lee | H02M 7/44 |
| 2019/0146532 A1* | 5/2019 | Ballarin | G05F 1/462 323/283 |
| 2019/0334352 A1* | 10/2019 | Sugimoto | H02M 7/48 |

FOREIGN PATENT DOCUMENTS

| JP | 9-084388 A | 3/1997 |
| JP | 10-201105 A | 7/1998 |

OTHER PUBLICATIONS

International Search Report and Written Opinion mailed on Jan. 19, 2021 in PCT/JP2020/042507 filed on Nov. 13, 2020 (citing reference AP therein, 7 pages).
International Preliminary Report on Patentability mailed on May 25, 2023 in PCT/JP2020/042507, filed on Nov. 13, 2020 (submitting English translation), 6 pages.

\* cited by examiner

*Primary Examiner* — Harry R Behm
(74) *Attorney, Agent, or Firm* — Oblon, McClelland, Maier & Neustadt, L.L.P.

(57) ABSTRACT

A control device for a power converter includes a voltage command value limiting unit configured to limit each phase component or an absolute value of a vector of a voltage command value to be equal to or less than a value set in advance. With such a configuration, the control device for the power converter limits each phase component or the absolute value of the vector of the voltage command value to be equal to or less than the value set in advance. Therefore, it is possible to prevent overvoltage of the output from the power converter when impedance rapidly increases on the output side of the power converter.

20 Claims, 7 Drawing Sheets

(a) PHASE VOLTAGE (PEAK IS 100%)

(b) LINE VOLTAGE (PEAK IS 100%)

CASE WHERE OUTPUT VOLTAGE COMMAND VALUE IS 120% OF RATING, AND PHASE VOLTAGE OF OUTPUT IS LIMITED TO 100% OF RATING.

(c) PHASE VOLTAGE (PEAK IS 100%)

(d) LINE VOLTAGE (PEAK IS 115%)

CONTROL DEVICE FOR CONTROLLING AN OUTPUT VOLTAGE OF A POWER CONVERTER

FIELD

The present disclosure relates to a control device for a power converter.

BACKGROUND

PTL 1 discloses a power system. In the power system, operation control of a plurality of power converters can be performed by one control device.

CITATION LIST

Patent Literature

[PTL 1] JP H10-201105 A

SUMMARY

Technical Problem

However, in the power system described in PTL 1, when a breaker on the output side of the power converter is opened due to a failure of a system or the like, impedance rapidly increases on the output side of the power converter. Therefore, overvoltage may occur in an output from the power converter.

The present disclosure has been made to overcome the above-mentioned problem. It is an object of the present disclosure to provide a control device for a power converter, the control device being capable of preventing overvoltage of an output from the power converter when impedance rapidly increases on the output side of the power converter.

Solution to Problem

A control device for a power converter according to the present disclosure includes a voltage command value limiting unit configured to limit each phase component or an absolute value of a vector of a voltage command value to be equal to or less than a value set in advance.

A control device for a power converter according to the present disclosure includes a current feedback control output limiting unit configured to limit each phase component or an absolute value of a vector of a current feedback control output to be equal to or less than a value set in advance.

Advantageous Effects of Invention

According to the present disclosure, each phase component or an absolute value of a vector of a voltage command value or a current feedback control output are limited to be equal to or less than a value set in advance. Therefore, it is possible to prevent overvoltage of an output from the power converter when impedance rapidly increases on the output side of the power converter.

DESCRIPTION OF EMBODIMENTS

Embodiments will be described with reference to attached drawings. In the respective drawings, identical or corresponding components are given the same reference symbols. Repetitive descriptions of such components will be simplified or omitted when appropriate.

Embodiment 1

Figure 1:
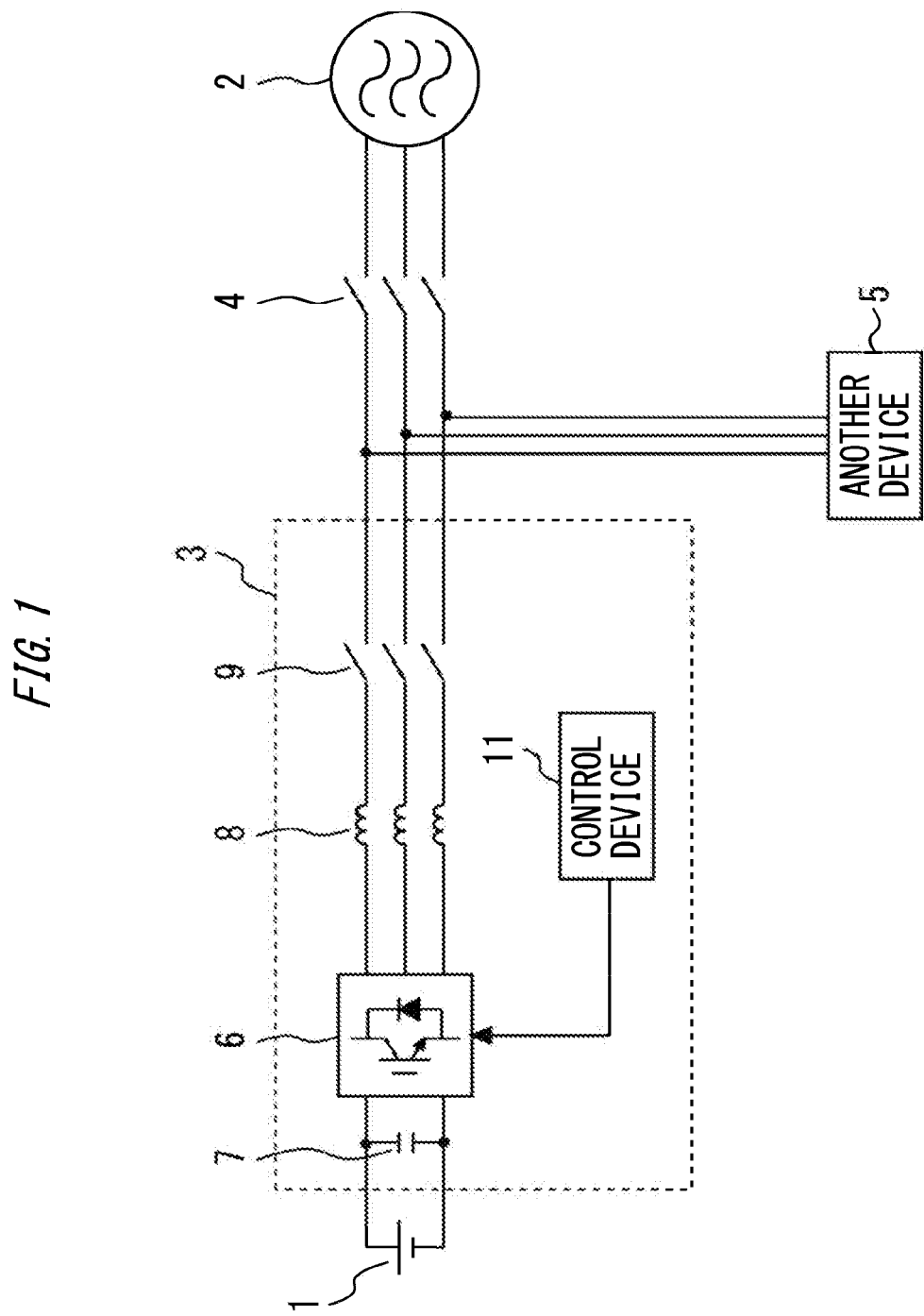
FIG. 1 is a configuration diagram of a power system in which a control device for a power converter according to an embodiment 1 is used.

FIG. 1 is a configuration diagram of a power system in which a control device for a power converter according to an embodiment 1 is used.

In the power system shown in FIG. 1, a DC power supply 1 is provided in an outdoor environment. For example, the DC power supply 1 may be a solar cell. An AC power supply 2 is operated by a power company or the like. A power conversion system 3 is connected between the DC power supply 1 and the AC power supply 2. A plurality of breakers 4 are connected between the AC power supply 2 and the power conversion system 3. Another device 5 is connected between the plurality of breakers 4 and the power conversion system 3.

The power conversion system 3 includes a power converter 6, a DC capacitor 7, a plurality of AC reactors 8, a plurality of AC switches 9, a transformer 10, and a control device 11.

The power converter 6 is provided to allow conversion of DC power from the DC power supply 1 to AC power. The DC capacitor 7 is provided to smooth a DC voltage from the DC power supply 1. The plurality of AC reactors 8 are provided to suppress harmonics in AC voltage from the power converter 6. The plurality of AC switches 9 are provided to allow closing/opening of lines on the output side of the power converter 6. The control device 11 is provided to allow control of the power converter 6 based on output currents of the power converter 6.

Next, the main part of the control device 11 will be described with reference to FIG. 2.

Figure 2:
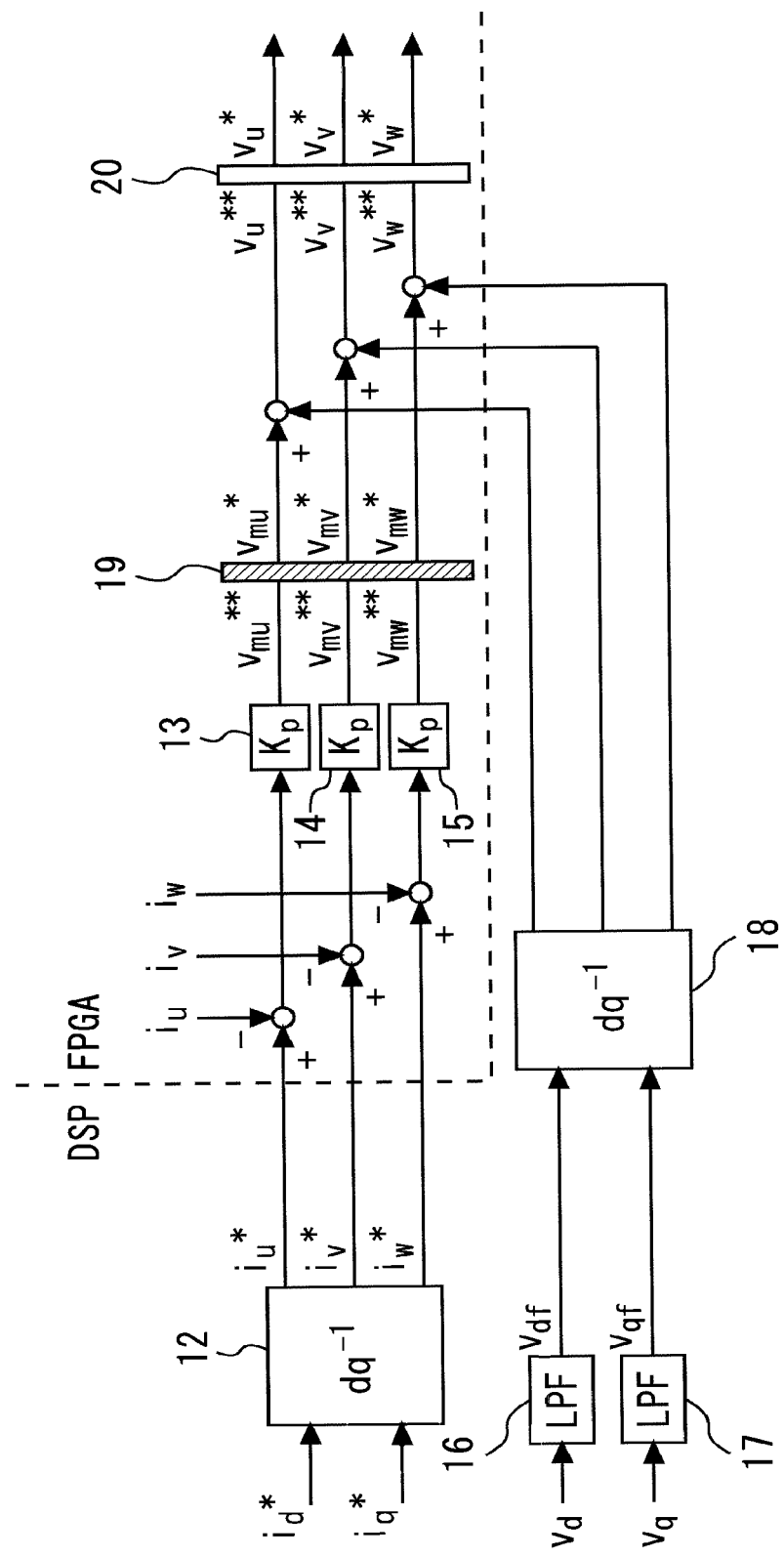
FIG. 2 is a configuration diagram of the main part of the control device for the power converter according to the embodiment 1.

FIG. 2 is a configuration diagram of the main part of the control device for the power converter according to the embodiment 1.

As shown in FIG. 2, the control device 11 includes a first inverse dq conversion unit 12, a first proportion unit 13, a second proportion unit 14, a third proportion unit 15, a first filter unit 16, a second filter unit 17, a second inverse dq conversion unit 18, a current feedback control output limiting unit 19, and a voltage command value limiting unit 20.

In a DSP, the first inverse dq conversion unit 12 receives inputs of a d-axis current command value $i_d^*$ and a q-axis current command value $i_q{}^*$. The first inverse dq conversion unit 12 performs inverse dq conversion on the d-axis current command value $i_d{}^*$ and the q-axis current command value $i_q{}^*$ to output a U-phase current command value $i_u{}^*$, a v-phase current command value $i_v{}^*$, and a w-phase current command value $i_w{}^*$.

In an FPGA, the first proportion unit 13 receives an input of a deviation between the U-phase current command value $i_u{}^*$ and an actual U-phase current measurement value $i_u$. The first proportion unit 13 proportionally controls the deviation between the U-phase current command value $i_u{}^*$ and the actual U-phase current measurement value $i_u$ to output a U-phase reference voltage command value.

In the FPGA, the second proportion unit 14 receives an input of a deviation between the V-phase current command value $i_v{}^*$ and an actual V-phase current measurement value $i_v$. The second proportion unit 14 proportionally controls the deviation between the v-phase current command value $i_v{}^*$ and the actual V-phase current measurement value $i_v$ to output a V-phase reference voltage command value.

In the FPGA, the third proportion unit 15 receives an input of a deviation between the W-phase current command value $i_w{}^*$ and an actual W-phase current measurement value $i_w$. The third proportion unit 15 proportionally controls the deviation between the w-phase current command value and the actual W-phase current measurement value to output a W-phase reference voltage command value.

In the DSP, the first filter unit 16 receives an input of a d-axis component $v_d$ of an actual AC voltage measurement value. The first filter unit 16 applies a low-pass filter to the d-axis component $v_d$ of the actual AC voltage measurement value to output a d-axis low frequency component $v_{df}$ of the actual AC voltage measurement value.

In the DSP, the second filter unit 17 receives an input of a q-axis component $v_q$ of an actual AC voltage measurement value. The second filter unit 17 applies a low-pass filter to the q-axis component $v_q$ of the actual AC voltage measurement value to output a q-axis low frequency component $v_{qf}$ of the actual AC voltage measurement value.

In the DSP, the second inverse dq conversion unit 18 receives inputs of the d-axis low frequency component $v_{df}$ and the q-axis low frequency component $v_{qf}$ of the actual AC voltage measurement value. The second inverse dq conversion unit 18 performs inverse dq conversion on the d-axis low frequency component $v_{df}$ and the q-axis low frequency component $v_{qf}$ of the actual AC voltage measurement value to output a U-phase low frequency component, a V-phase low frequency component, and a W-phase low frequency component.

A U-phase voltage command value $v_u{}^*$ can be obtained by adding a U-phase reference voltage command value $v_{mu}{}^*$ and a U-phase low frequency component $v_{uf}$. A V-phase voltage command value $v_v{}^*$ can be obtained by adding a V-phase reference voltage command value $v_{mv}{}^*$ and a V-phase low frequency component $v_{vf}$. A W-phase voltage command value $v_w{}^*$ can be obtained by adding a W-phase reference voltage command value $v_{mw}{}^*$ and a W-phase low frequency component $v_{wf}$.

In the FPGA, the current feedback control output limiting unit 19 is provided at a position closer to the first proportion unit 13, the second proportion unit 14, and the third proportion unit 15 than portions where the reference voltage commands of the respective phases and the low frequency components of the respective phases are added. The current feedback control output limiting unit 19 directly limits each phase component or the absolute value of the vector of a current feedback control output.

In the FPGA, the voltage command value limiting unit 20 is provided at a position opposite to the first proportion unit 13, the second proportion unit 14, and the third proportion unit 15 with respect to portions where the reference voltage commands of the respective phases and the low frequency components of the respective phases are added. The voltage command value limiting unit 20 directly limits each phase component or the absolute value of the vector of a voltage command value.

Next, examples of the current feedback control output limiting unit 19 and the voltage command value limiting unit 20 will be described with reference to FIG. 3.

Figure 3:
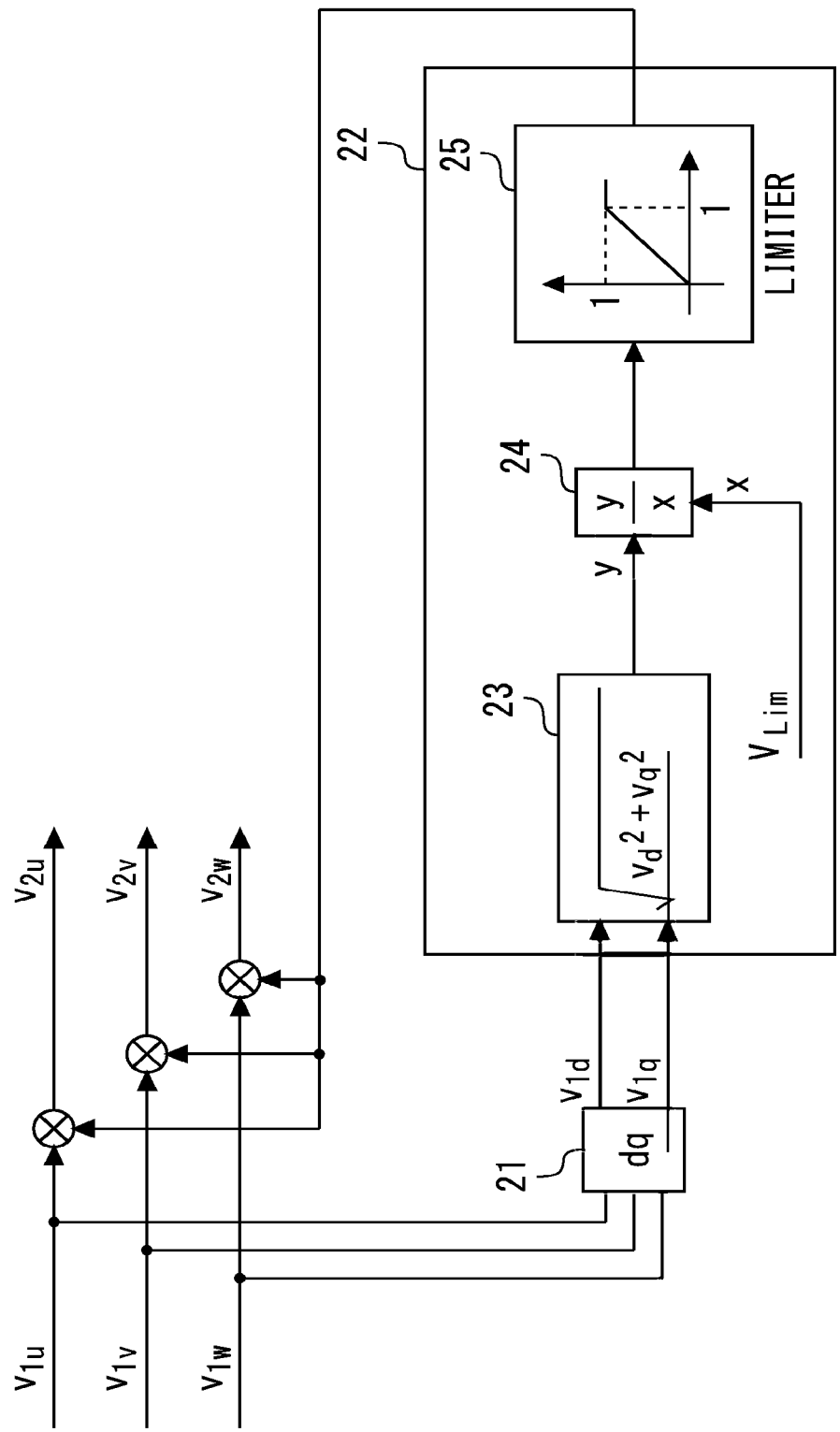
FIG. 3 is a configuration diagram of the main part of the control device for the power converter according to the embodiment 1.

FIG. 3 is a configuration diagram of the main part of the control device for the power converter according to the embodiment 1.

With regard to the current feedback control output limiting unit 19, $v_{1u}$, $v_{1v}$, $v_{1w}$ shown in FIG. 3 respectively correspond to $v_{mu}{}^{}$, $v_{mv}{}^{}$, $v_{mw}{}^{**}$, and $v_{2u}$, $v_{2v}$, $v_{2w}$ respectively correspond to $v_{mu}{}^*$, $v_{mv}{}^*$, $v_{mw}{}^*$. With regard to the voltage command value limiting unit 20, $v_{1u}$, $v_{1v}$, $v_{1w}$ shown in FIG. 3 respectively correspond to $v_u{}^{}$, $v_v{}^{}$, $v_w{}^{**}$, and $v_{2u}$, $v_{2v}$, $v_{2w}$ respectively correspond to $v_u{}^*$, $v_v{}^*$, $v_w{}^*$.

As shown in FIG. 3, each of the current feedback control output limiting unit 19 and the voltage command value limiting unit 20 includes a first dq conversion unit 21 and a first limitation setting unit 22. The first limitation setting unit 22 includes a first vector absolute value calculation unit 23, a first comparison unit 24, and a first absolute value limiting unit 25.

The first dq conversion unit 21 receives inputs of $v_{1u}$, $v_{1v}$, $v_{1w}$. The first dq conversion unit 21 performs dq conversion on $v_{1u}$, $v_{1v}$, $v_{1w}$ to output a d-axis voltage $v_{1d}$ and a q-axis voltage $v_{1q}$.

The first vector absolute value calculation unit 23 receives inputs of the d-axis voltage via and the q-axis voltage $v_{1q}$. The first vector absolute value calculation unit 23 calculates the square root of the sum of the square of the d-axis voltage via and the square of the q-axis voltage $v_{1q}$ to output an absolute value y of the vector of the voltage command value.

The first comparison unit 24 receives inputs of the absolute value y of the vector of the voltage command value and a reference absolute value x. The first comparison unit 24 divides the absolute value y of the vector of the voltage command value by the reference absolute value x to output the value of the ratio of the absolute value y of the vector of the voltage command value to the reference absolute value x.

The first absolute value limiting unit 25 receives an input of the value of the ratio of the absolute value y of the vector of the voltage command value to the reference absolute value x. When the value of the ratio of the absolute value y of the vector of the voltage command value to the reference absolute value x is less than 1, the first absolute value limiting unit 25 outputs the value of the ratio of the absolute value y of the vector of the voltage command value to the reference absolute value x. When the value of the ratio of the absolute value y of the vector of the voltage command value to the reference absolute value x is 1 or more, the first absolute value limiting unit 25 outputs 1.

The U-phase voltage $v_{2u}$ can be obtained by multiplying the U-phase voltage $v_{1u}$ by an output value from the first absolute value limiting unit 25. The V-phase voltage $v_{2v}$ can be obtained by multiplying the U-phase voltage $v_{1u}$ by an output value from the first absolute value limiting unit 25. The W-phase voltage $v_{2w}$ can be obtained by multiplying the U-phase voltage $v_{1w}$ by an output value from the first absolute value limiting unit 25.

Next, phase voltages and line voltages of output from the power converter 6 will be described with reference to FIG. 4.

Figure 4:
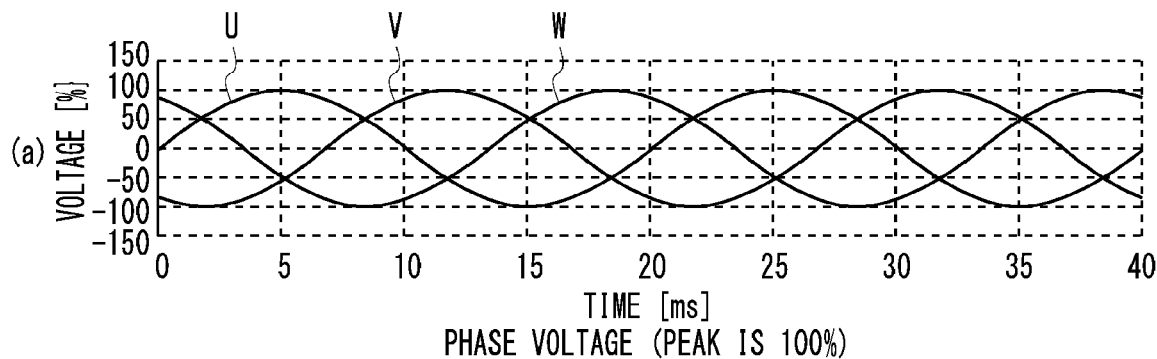
FIG. 4 is a graph showing output voltages of the power converter controlled by the control device for the power converter according to the embodiment 1.
Figure 4:
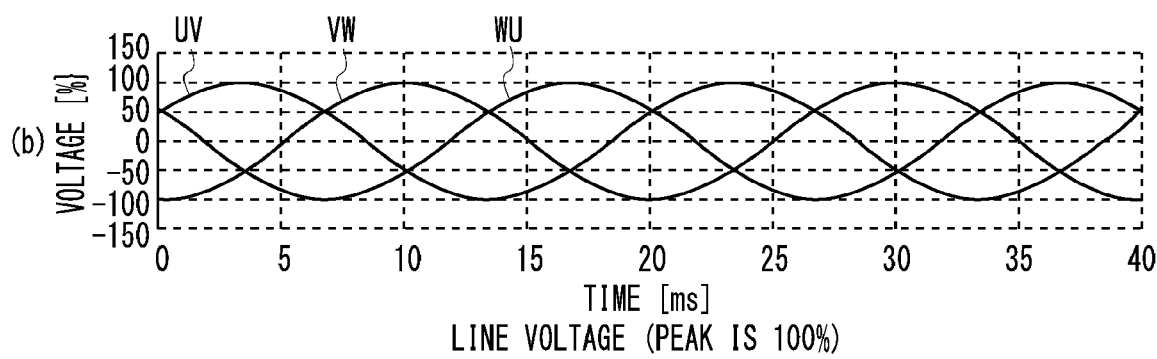
Figure 4:
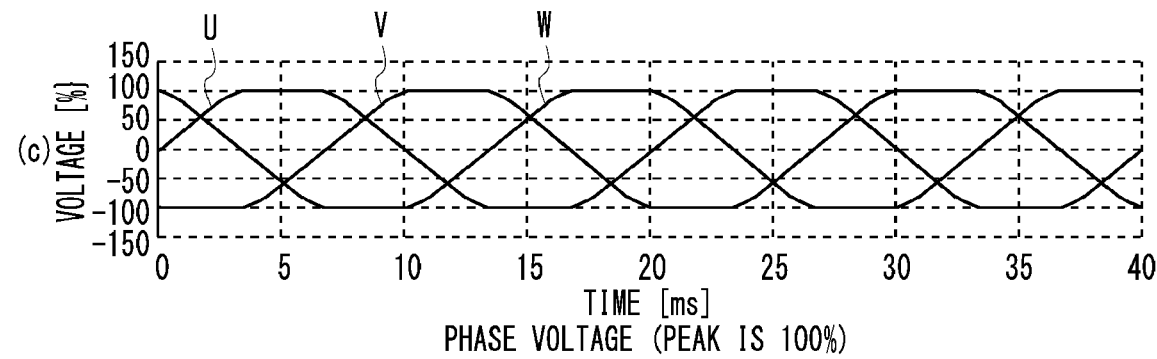
Figure 4:
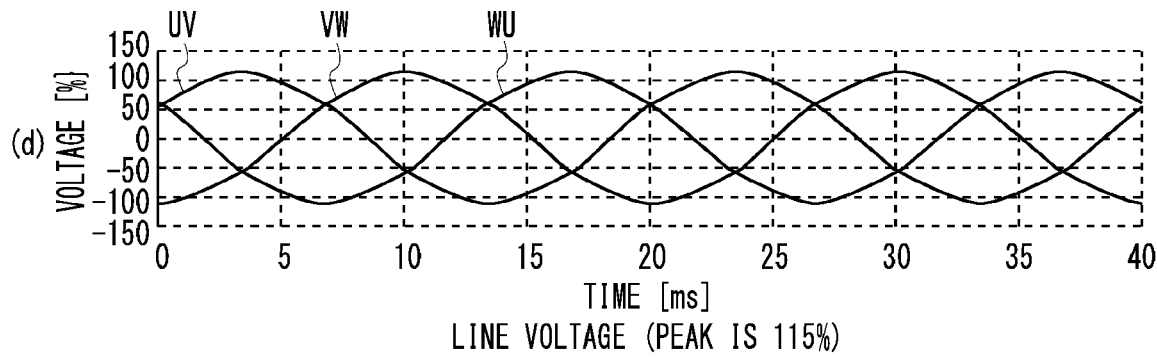

FIG. 4 is a graph showing output voltages of the power converter controlled by the control device for the power converter according to the embodiment 1.

In FIG. 4, (a) shows phase voltages in the case where the voltage command value is 100% of the rating, and an output voltage is not limited. In FIG. 4, (b) shows line voltages in the case where the voltage command value is 100% of the rating, and an output voltage is not limited.

As shown in (a) and (b) of FIG. 4, in the case where the voltage command value is 100% of the rating, peak values of the phase voltage and the line voltage are 100% of the rating.

In FIG. 4, (c) shows phase voltages in the case where the voltage command value is 120% of the rating, and the phase voltage is limited to 100% of the rating. In FIG. 4, (d) shows line voltages in the case where the voltage command value is 120% of the rating, and the phase voltage is limited to 100% of the rating.

As shown in (c) of FIG. 4, in the case where the voltage command value is 120% of the rating, the peak value of the phase voltage is 100% of the rating. In this case, the phase voltage has a trapezoidal shape. As shown in (d) of FIG. 4, in the case where the voltage command value is 120% of the rating, the peak value of the line voltage is 115% of the rating. In this case, the line voltage has a triangular waveform.

According to the above-described embodiment 1, the current feedback control output limiting unit 19 directly limits each phase component or the absolute value of the vector of a current feedback control output. Therefore, it is possible to prevent overvoltage of an output from the power converter 6 when impedance rapidly increases on the output side of the power converter 6.

Further, the current feedback control output limiting unit 19 suppresses the time change rate of the output voltage of the power converter 6. Therefore, it is possible to reduce overshoot of voltage when overvoltage of an output from the power converter 6 is detected.

The voltage command value limiting unit 20 directly limits each phase component or the absolute value of the vector of a voltage command value. Therefore, it is possible to prevent overvoltage of an output from the power converter 6 when impedance rapidly increases on the output side of the power converter 6.

As shown in FIG. 4, when each phase component of an output voltage is simply limited, each phase component of the output voltage has a trapezoidal shape. In contrast, the line voltage has a triangular waveform.

Accordingly, the peak value of the line voltage is greater than a value obtained by multiplying the peak value of the phase voltage by the square root of 3. For example, in the case where each phase component of the output voltage is limited to 110% of the rating, the peak value of the phase voltage is limited to 110% of the rating, but the peak value of the line voltage is greater than 110% of the rating. Therefore, such a configuration may be insufficient as a countermeasure against overvoltage for another device 5 connected to the output of the power converter 6.

In contrast, in the case where the absolute value of the vector of the output voltage is limited, each phase component after limitation has a sine wave. Therefore, the line voltage also has a sine wave. As a result, the peak value of the phase voltage and the peak value of the line voltage can be appropriately limited.

Next, an example of the control device 11 will be described with reference to FIG. 5.

Figure 5:
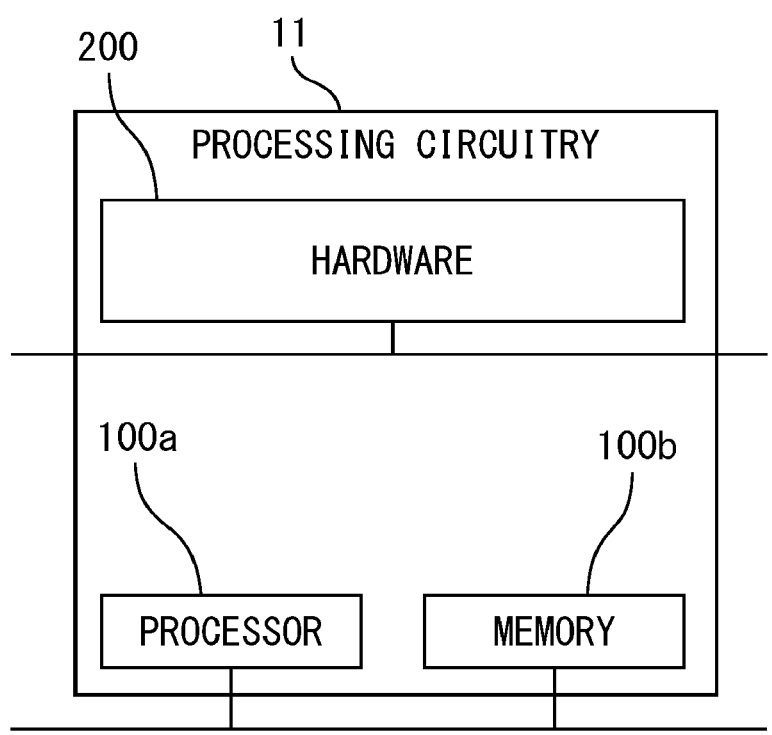
FIG. 5 is a hardware configuration diagram of the control device for the power converter according to the embodiment 1.

FIG. 5 is a hardware configuration diagram of the control device for the power converter according to the embodiment 1.

Respective functions of the control device 11 can be achieved by a processing circuitry. For example, the processing circuitry includes at least one processor 100*a* and at least one memory 100*b*. For example, the processing circuitry includes at least one dedicated hardware 200.

In the case where the processing circuitry includes at least one processor 100*a* and at least one memory 100*b*, respective functions of the control device 11 are achieved by software, firmware or a combination of the software and the firmware. At least either of the software and the firmware is described as a program. At least either of the software and the firmware is stored in at least one memory 100*b*. At least one processor 100*a* reads and executes the program stored in at least one memory 100*b* to achieve the respective functions of the control device 11. At least one processor 100*a* is also referred to as a central processing unit, a processing unit, an arithmetic unit, a microprocessor, a microcomputer, or a DSP. For example, at least one memory 100*b* may be a nonvolatile or volatile semiconductor memory, such as a RAM, a ROM, a flash memory, an EPROM, or an EEPROM, or may be a magnetic disk, a flexible disk, an optical disc, a compact disc, a minidisc, a DVD, or the like.

In the case where the processing circuitry includes at least one dedicated hardware 200, the processing circuitry may be achieved by, for example, a single circuitry, a composite circuitry, a programmed processor, a parallel programmed processor, an ASIC, an FPGA, or a combination of the above. For example, the respective functions of the control device 11 may be respectively achieved by the processing circuitries. For example, the respective functions of the control device 11 may be collectively achieved by the processing circuitry.

Some of the respective functions of the control device 11 may be achieved by the dedicated hardware 200, and other functions may be achieved by the software or the firmware. For example, the function of the current feedback control output limiting unit 19 and the function of the voltage command value limiting unit 20 may be achieved by the processing circuitry forming the dedicated hardware 200, and functions other than the function of the current feedback control output limiting unit 19 and the function of the voltage command value limiting unit 20 may be achieved by at least one processor 100*a* reading and executing the program stored in at least one memory 100*b*.

As described above, the processing circuitry achieves the respective functions of the control device 11 by the hardware 200, the software, the firmware, or a combination of these.

Embodiment 2

Figure 6:
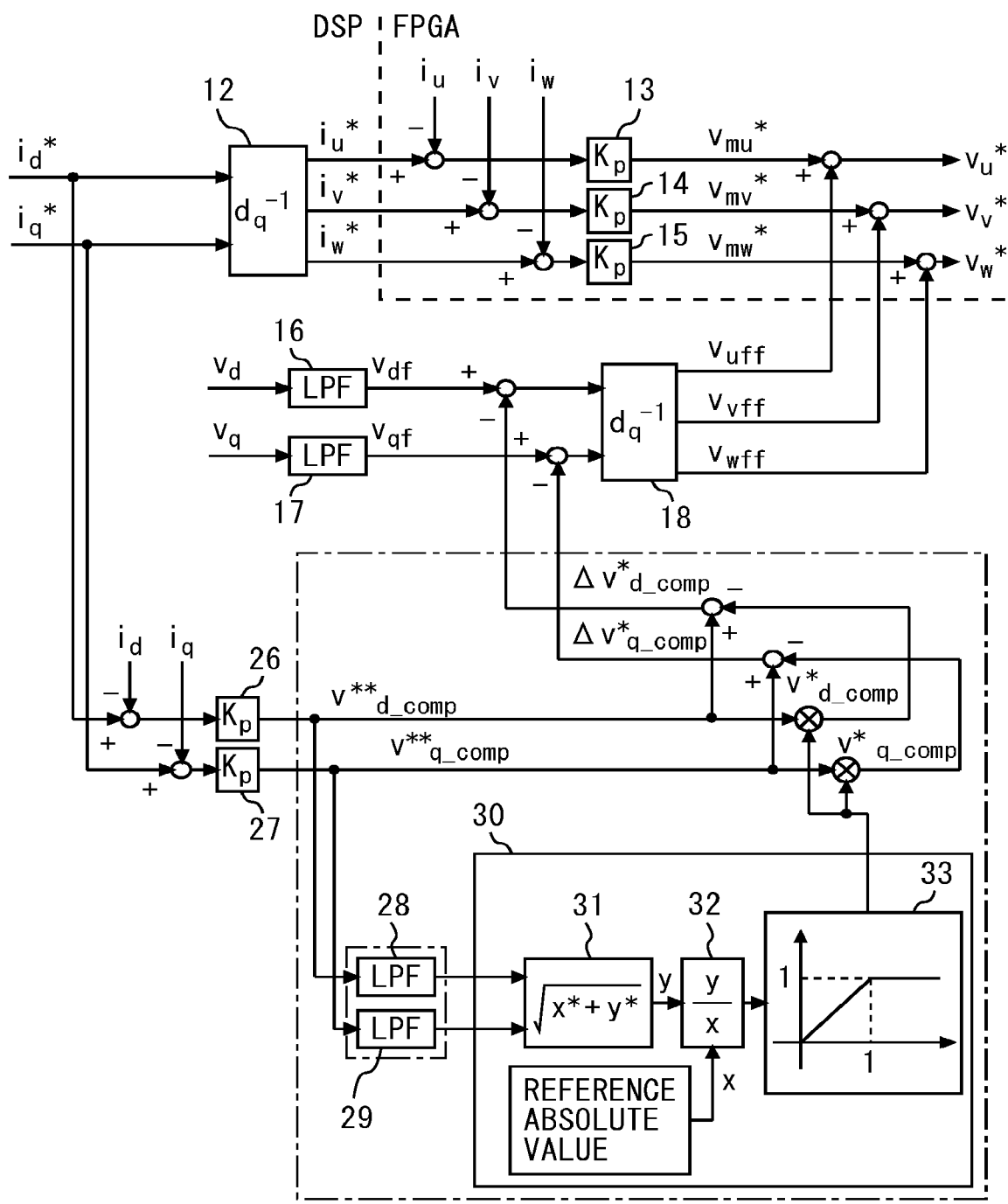
FIG. 6 is a configuration diagram of a control device for a power converter according to an embodiment 2.

FIG. 6 is a configuration diagram of a control device for a power converter according to an embodiment 2. Components identical or corresponding to the components in the embodiment 1 are given the same reference symbols. The description of such components will be omitted.

In the embodiment 2, the control device 11 includes, in the DSP, a fourth proportion unit 26, a fifth proportion unit 27, a third filter unit 28, a fourth filter unit 29, and a second limitation setting unit 30. The second limitation setting unit 30 has a function substantially equal to the function of the first limitation setting unit 22. To be more specific, the second limitation setting unit 30 includes a second vector absolute value calculation unit 31, a second comparison unit 32, and a second absolute value limiting unit 33.

The fourth proportion unit 26 receives an input of a deviation between the d-axis current command value $i_d^*$ and an actual d-axis current measurement value $i_d$. The fourth proportion unit 26 proportionally controls the deviation between the d-axis current command value $i_d^*$ and the actual d-axis current measurement value $i_d$ to output a d-axis component $v^{**}_{d\_comp}$ of a reference correction term.

The fifth proportion unit 27 receives an input of a deviation between the q-axis current command value $i_q^*$ and an actual q-axis current measurement value $i_q$. The fifth proportion unit 27 proportionally controls the deviation between the q-axis current command value $i_q^*$ and the actual q-axis current measurement value $i_q$ to output a q-axis component $v^{**}_{q\_comp}$ of a reference correction term.

The third filter unit 28 receives an input of the d-axis component $v^{}_{d\_comp}$ of a reference voltage command value. The third filter unit 28 outputs a d-axis low frequency component of the reference voltage command value to the d-axis component $v^{}_{d\_comp}$ of the reference voltage command value.

The fourth filter unit 29 receives an input of the q-axis component $v^{}_{q\_comp}$ of the reference voltage command value. The fourth filter unit 29 outputs a q-axis low frequency component of the reference voltage command value to the q-axis component $v^{}_{q\_comp}$ of the reference voltage command value.

The second vector absolute value calculation unit 31 receives inputs of the d-axis low frequency component and the q-axis low frequency component of the reference voltage command value. The second vector absolute value calculation unit 31 calculates the square root of the sum of the square of the d-axis low frequency component of the reference voltage command value and the square of the q-axis low frequency component of the reference voltage command value to output the absolute value of the vector of the reference voltage command value.

The second comparison unit 32 receives inputs of the absolute value of the vector of the reference voltage command value and a reference absolute value. The second comparison unit 32 divides the absolute value of the vector of the reference voltage command value by the reference absolute value to output a value of the ratio of the absolute value of the vector of the reference voltage command value to the reference absolute value.

The second absolute value limiting unit 33 receives an input of the value of the ratio of the absolute value of the vector of the reference voltage command value to the reference absolute value. When the value of the ratio of the absolute value of the vector of the reference voltage command value to the reference absolute value is less than 1, the second absolute value limiting unit 33 outputs the value of the ratio of the absolute value of the vector of the reference voltage command value to the reference absolute value. When the value of the ratio of the absolute value of the vector of the reference voltage command value to the reference absolute value is 1 or more, the second absolute value limiting unit 33 outputs 1.

A d-axis component $v^*_{d\_comp}$ of a voltage command value can be obtained by multiplying the d-axis component $v^{**}_{d\_comp}$ of the reference voltage command value by an output value from the second absolute value limiting unit 33. A q-axis component $v^*_{q\_comp}$ of a correction term can be obtained by multiplying the q-axis component $v^{**}_{q\_comp}$ of the reference voltage command value by the output value from the second absolute value limiting unit 33.

A d-axis component correction term $\Delta v^*_{d\_comp}$ can be obtained by subtracting the d-axis component $v^*_{d\_comp}$ of the voltage command value from the d-axis component $v^{**}_{d\_comp}$ of the reference voltage command value. The d-axis component correction term is added to a q-axis low frequency component $v_{df}$ of an actual AC voltage measurement value.

A q-axis component correction term $\Delta v^*_{q\_comp}$ can be obtained by subtracting the q-axis component $v^*_{q\_comp}$ of the voltage command value from the q-axis component $v^{**}_{q\_comp}$ of the reference voltage command value. The q-axis component correction term $\Delta v^*_{q\_comp}$ is added to a q-axis low frequency component $v_{qf}$ of an actual AC voltage measurement value.

Each of the proportional gains of the first proportion unit 13, the second proportion unit 14, and the third proportion unit 15 in the FPGA, and each of the proportional gains of the fourth proportion unit 26 and the fifth proportion unit 27 in the DSP are equal, that is, $K_p$. Therefore, if a difference in arithmetic step between the DSP and the FPGA is ignored, a d-axis component and a q-axis component obtained by performing dq conversion on $v_{mu}^*$, $v_{mv}^*$, $v_{mw}^*$ are respectively equal to the d-axis component $v^{}_{d\_comp}$ and the q-axis component $v^{}_{q\_comp}$.

The $v^*_{d\_comp}$ and $v^*_{q\_comp}$ are respectively values obtained by limiting $v^{}_{d\_comp}$ and $v^{}_{q\_comp}$ by the second limitation setting unit 30. Therefore, values obtained by performing dq conversion on the results obtained by subtracting results obtained by performing inverse dq conversion on $\Delta v^*_{d\_comp}$ and $\Delta v^*_{q\_comp}$ from $v_{mu}^*$, $v_{mv}^*$, $v_{mw}^*$ in the FPGA are equal to values obtained such that dq conversion is performed on $v_{mu}^*$, $v_{mv}^*$, and $v_{mw}^*$, and the absolute value of the result is limited to a reference absolute value by using an arithmetic operation substantially equivalent to the arithmetic operation used in the second limitation setting unit 30.

That is, by the arithmetic operation in the DSP, the absolute value of the voltage vector corresponding to $v_{mu}^*$, $v_{mv}^*$, and $v_{mw}^*$, which are values in the FPGA, is indirectly limited to the reference absolute value of the second limitation setting unit 30.

Further, $v^{}_{d\_comp}$ and $v^{}_{q\_comp}$ are respectively subjected to the third filter unit 28 and the fourth filter unit 29 before the arithmetic operation of the second limitation setting unit 30 is performed on $v^{}_{d\_comp}$ and $v^{}_{q\_comp}$. Therefore, amounts to be indirectly limited are values obtained in such a manner that dq conversion is performed on $v_{mu}^*$, $v_{mv}^*$, and $v_{mw}^*$ in the FPGA, and filters corresponding to the third filter unit 28 and the fourth filter unit 29 are applied to the results.

Accordingly, a frequency band in which $v_{mu}^*$, $v_{mv}^*$, and $v_{mw}^*$ are limited can be adjusted based on characteristics of the third filter unit 28 and the fourth filter unit 29.

The order of the inverse dq conversion and the subtraction in the above-mentioned description partially differs from the order of the inverse dq conversion and the subtraction in FIG. 6. However, both orders of operation are equivalent because of linearity of each operation.

According to the above-described embodiment 2, in the FPGA, the vector of a current control output in a lower frequency domain takes a value equal to or less than a value set in advance. In such a case, a correction term is added to a feedforward term such that the vector of the voltage command value in the FPGA is equal to the vector of the voltage command value in the DSP. Therefore, the voltage command value in the FPGA can be indirectly limited by the arithmetic operation in the DSP. As a result, it is possible to increase the degree of freedom for mounting a control device.

The arithmetic operation of the correction term is performed in a carrier peak-trough cycle. Therefore, the frequency band of the correction term is lower than the frequency band of the current control output of the FPGA per se. Accordingly, a harmonic component of an original voltage command value, which is a control arithmetic result in the FPGA, is not removed. Therefore, there is no possibility that the correction term affects current controllability when a current instantaneously varies.

Embodiment 3

Figure 7:
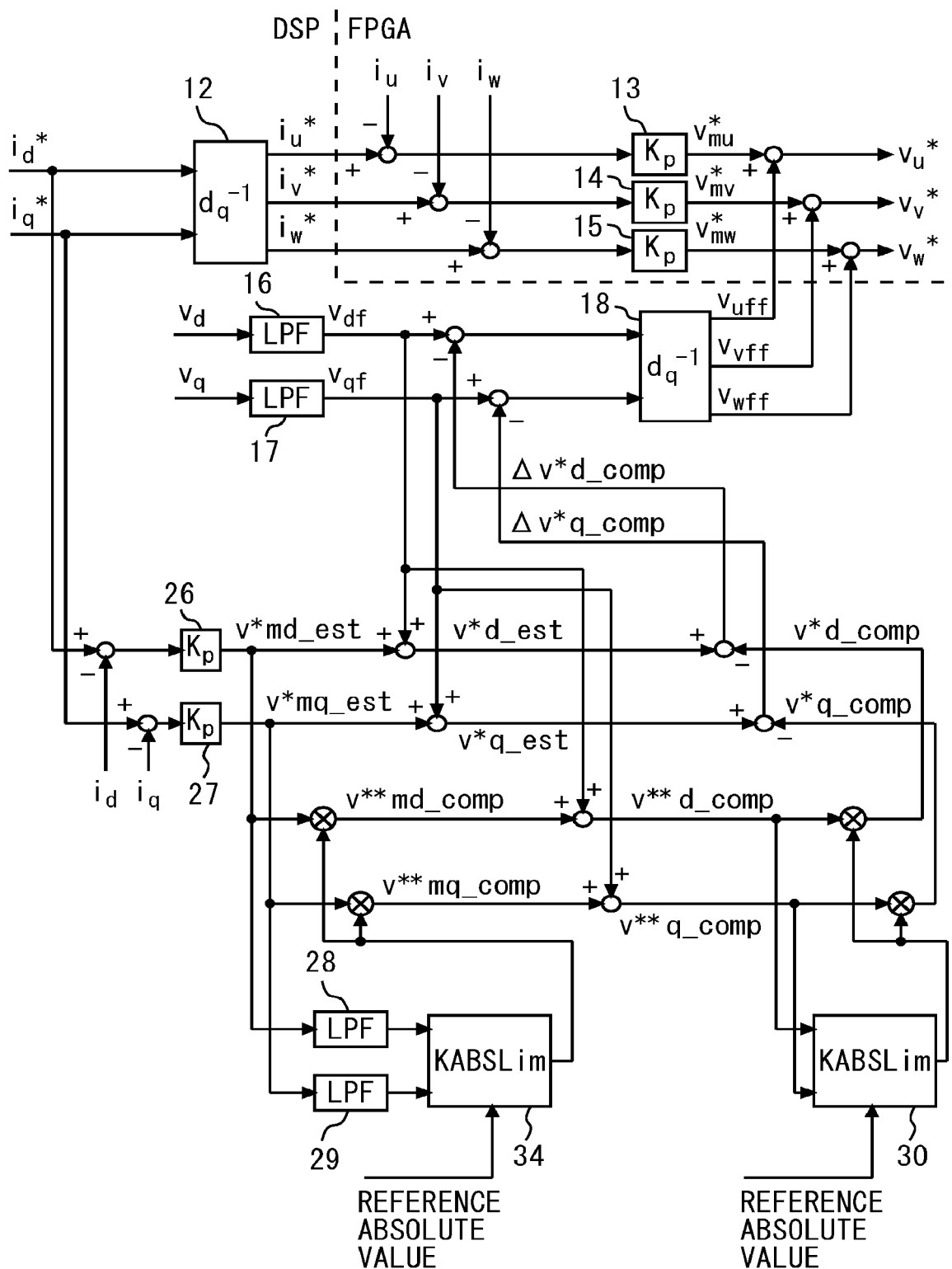
FIG. 7 is a configuration diagram of a control device for a power converter according to an embodiment 3.

FIG. 7 is a configuration diagram of a control device for a power converter according to an embodiment 3. Components identical or corresponding to the components in the embodiment 2 are given the same reference symbols. The description of such components will be omitted.

In the embodiment 3, the control device 11 includes a third limitation setting unit 34 in the DSP. The third limitation setting unit 34 has a function substantially equal to the function of the second limitation setting unit 30. The third limitation setting unit 34 receives an input of a d-axis low frequency component of a reference voltage estimated value from the third filter unit 28. The third limitation setting unit 34 receives an input of a q-axis low frequency component of the reference voltage estimated value from the fourth filter unit 29. The third limitation setting unit 34 receives an input of the reference absolute value of a current feedback control output.

The third limitation setting unit 34 calculates the square root of the sum of the square of the d-axis low frequency component of the reference voltage estimated value and the square of the q-axis low frequency component of the reference voltage estimated value to calculate the absolute value of the vector of the reference voltage estimated value. The third limitation setting unit 34 divides the absolute value of the vector of the reference voltage estimated value by the reference absolute value of the current feedback control output to calculate a value of the ratio of the absolute value of the vector of the reference voltage estimated value to the reference absolute value of the current feedback control output.

When the value of the ratio of the absolute value of the vector of the reference voltage estimated value to the reference absolute value of the current feedback control output is less than 1, the third limitation setting unit 34 outputs the value of the ratio of the absolute value of the vector of the reference voltage estimated value to the reference absolute value of the current feedback control output. When the value of the ratio of the absolute value of the vector of the reference voltage estimated value to the reference absolute value of the current feedback control output is 1 or more, the third limitation setting unit 34 outputs 1.

A d-axis component $v^{**}_{md\_comp}$ of a command value can be obtained by multiplying a d-axis component $v^{*}_{md\_est}$ of the estimated value by an output value from the third limitation setting unit 34. A q-axis component $v^{**}_{mq\_comp}$ of the command value can be obtained by multiplying a q-axis component $v^{*}_{mq\_est}$ of the estimated value by the output value from the third limitation setting unit 34.

A d-axis component $v^{}_{d\_comp}$ of a reference voltage command value can be obtained by adding the d-axis component $v^{}_{md\_comp}$ of the command value and a d-axis low frequency component $v_{df}$ of an actual AC voltage measurement value. A q-axis component $v^{}_{q\_comp}$ of the reference voltage command value can be obtained by adding the q-axis component $v^{}_{mq\_comp}$ of the command value and a q-axis low frequency component $v_{qf}$ of the actual AC voltage measurement value.

A d-axis component $v^{*}_{d\_est}$ of the estimated value can be obtained by adding the d-axis component $v^{*}_{md\_est}$ of the estimated value and the d-axis low frequency component $v_{df}$ of the actual AC voltage measurement value. A q-axis component $v^{*}_{q\_est}$ of the estimated value can be obtained by adding the q-axis component $v^{*}_{mq\_est}$ of the estimated value and the q-axis low frequency component $v_{qf}$ of the actual AC voltage measurement value.

A d-axis component correction term $\Delta v^{*}_{d\_comp}$ can be obtained by subtracting a d-axis component $v^{*}_{d\_comp}$ of a voltage command value from the d-axis component $v^{*}_{d\_est}$ of the estimated value. A q-axis component correction term $\Delta v^{*}_{q\_comp}$ can be obtained by subtracting a q-axis component $v^{*}_{q\_comp}$ of the voltage command value from the q-axis component $v^{*}_{q\_est}$ of the estimated value.

According to the above-described embodiment 3, in the FPGA, the absolute value of the vector of the voltage command value takes a value equal to or less than a value set in advance. In such a case, a correction term is added to a feedforward term such that the vector of the voltage command value in the FPGA is equal to the vector of the voltage command value in the DSP. Therefore, the arithmetic operation in the DSP can indirectly limit the voltage command value in the FPGA. As a result, it is possible to increase the degree of freedom for mounting a control device.

In the embodiment 1 to the embodiment 3, the AC side may be additional.

The control device 11 of the embodiment 1 to the embodiment 3 may also be used for the power converter 6 which converts power from AC to DC.

The control device 11 of the embodiment 1 to the embodiment 3 may also be used for a single-phase power system.

INDUSTRIAL APPLICABILITY

As has been described heretofore, the control device for the power converter of the present disclosure can be utilized for the power system.

REFERENCE SIGNS LIST

1 DC power supply, 2 AC power supply, 3 power conversion system, 4 breaker, 5 another device, 6 power converter, 7 DC capacitor, 8 AC reactor, 9 AC switch, 10 transformer, 11 control device, 12 first inverse dq conversion unit, 13 first proportion unit, 14 second proportion unit, 15 third proportion unit, 16 first filter unit, 17 second filter unit, 18 second inverse dq conversion unit, 19 current feedback control output limiting unit, 20 voltage command value limiting unit, 21 first dq conversion unit, 22 first limitation setting unit, 23 first vector absolute value calculation unit, 24 first comparison unit, 25 first absolute value limiting unit, 26 fourth proportion unit, 27 fifth proportion unit, 28 third filter unit, 29 fourth filter unit, 30 second limitation setting unit, 31 second vector absolute value calculation unit, 32 second comparison unit, 33 second absolute value limiting unit, 34 third limitation setting unit, 100a processor, 100b memory, 200 hardware

The invention claimed is:

1. A control device for a power converter that controls an output voltage of the power converter, the control device being configured to:
generate a reference voltage command value based on a deviation between a first current command value and a second current actual value or the first current command value;
generate a d-axis reference correction term based on a deviation between a d-axis current command value and a d-axis current actual value;
generate a q-axis reference correction term based on a deviation between a q-axis current command value and a q-axis current actual value;
generate a limit value for limiting the output voltage based on the d-axis reference correction term and the q-axis reference correction term;
generate a d-axis limited voltage command value obtained by limiting the d-axis reference correction term based on the limit value;
generate a q-axis limited voltage command value obtained by limiting the q-axis reference correction term based on the limit value;
generate a d-axis correction term by subtracting the d-axis limited voltage command value from the d-axis reference correction term;
generate a q-axis correction term by subtracting the q-axis limited voltage command value from the q-axis reference correction term;
generate a limited voltage value based on the d-axis correction term, a d-axis AC voltage actual value of the power converter, the q-axis correction term, and a q-axis AC voltage actual value of the power converter; and
generate a voltage command value by adding the reference voltage command value and the limited voltage value.

2. The control device for a power converter according to claim 1, wherein
the output voltage is a voltage value of a three phase component or a two phase component, and
the first current command value is a current value of a three phase component or a two phase component,
the second current actual value is a current value of a three phase component or a two phase component, and
the limited voltage value is a voltage value of three phase component or two phase component, and
the reference voltage command value is a voltage value of three phase component or two phase component.

3. The control device for a power converter according to claim 1, wherein
the first current command value is a current command value obtained by coordinate conversion of the d-axis current command value and the q-axis current command value into three phase components.

4. The control device for a power converter according to claim 1, wherein
the d-axis reference correction term is an estimated value of a reference voltage command value of a d-axis component obtained when the reference voltage command value is coordinate-converted into dq component, and
the q-axis reference correction term is an estimated value of a reference voltage command value of a q-axis component obtained when the reference voltage command value is coordinate-converted into dq component.

5. The control device for a power converter according to claim 1, wherein
in a process of generating the limit value, the control device is configured to:
generate a square root of a sum of a square of the d-axis reference correction term and a square of the q-axis reference correction term;
calculate a ratio value of the square root to a reference absolute value by dividing the square root by the reference absolute value; and
determine the limit value according to the ratio value.

6. The control device for a power converter according to claim 1, wherein
in a process of generating the limit value, the control device is configured to:
generate a square root of a sum of a square of a d-axis low-frequency component reference correction term obtained by applying a low pass filter to the d-axis reference correction term and a square of a q-axis low-frequency component reference correction term obtained by applying a low pass filter to the q-axis reference correction term;
calculate a ratio value of the square root to a reference absolute value by dividing the square root by the reference absolute value; and
determine the limit value according to the ratio value.

7. He control device for a power converter according to claim 1, wherein
in a process of generating the limited voltage value, the control device is configured to:
generate a first voltage by subtracting the d-axis correction term from the d-axis AC voltage actual value;
generate a second voltage by subtracting the q-axis correction term from the q-axis AC voltage actual value; and
generate the limited voltage value obtained by coordinate-converting the first voltage and the second voltage into three phase component.

8. The control device for a power converter according to claim 1, wherein
in a process of generating the limited voltage value, the control device is configured to:
generate an AC voltage actual value of a d-axis frequency component by applying a low pass filter to the d-axis AC voltage actual value;
generate an AC voltage actual value of a q-axis frequency component by applying a low pass filter to the q-axis AC voltage actual value;
generate a first voltage by subtracting the d-axis correction term from the AC voltage actual value of a d-axis frequency component;
generate a second voltage by subtracting the q-axis correction term from the AC voltage actual value of the q-axis frequency component, and
generate the limited voltage value obtained by coordinate-converting the first voltage and the second voltage into three phase component.

9. The control device for a power converter according to claim 1, wherein
the control device includes a first processor and a second processor,
the first processor is a processor having a shorter operation cycle than the second processor,
the first processor is configured to execute:
a process of generating the reference voltage command value; and a process of generating the voltage command value, the second processor is configured to execute:
a process of generating the d-axis reference correction term;
a process of generating the q-axis reference correction term;
a process of generating the limit value;
a process of generating the d-axis limited voltage command value; and
a process of generating the q-axis limited voltage command value.

10. A control device for a power converter that controls an output voltage of the power converter, the control device being configured to:
generate a reference voltage command value based on a deviation between a first current command value and a second current actual value or the first current command value;
generate a first estimated voltage of a d-axis component based on a deviation between a d-axis current command value and a d-axis current actual value;
generate a first estimated voltage of a q-axis component based on a deviation between a q-axis current command value and a q-axis current actual value;
generate a first limit value for limiting the output voltage based on the first estimated voltage of the d-axis component and the first estimated voltage of the q-axis component;
generate a first limited voltage command value of the d-axis component obtained by limiting the first estimated voltage of the d-axis component based on the first limit value;
generate a first limited voltage command value of the q-axis component obtained by limiting the first estimated voltage of the q-axis component based on the first limit value;
generate a second limit voltage command value of the d-axis component based on the first limited voltage command value of the d-axis component and a d-axis AC voltage actual value;
generate a second limited voltage command value of the q-axis component based on the first limited voltage command value of the q-axis component and a q-axis AC voltage actual value;
generate a second limit value for limiting the output voltage based on the second limit voltage command value of the d-axis component and the second limit voltage command value of the q-axis component;
generate a third limited voltage command value of the d-axis component obtained by limiting the second limited voltage command value of the d-axis component based on the second limit value;
generate a third limited voltage command value of the q-axis component by limiting the second limited voltage command value of the q-axis component based on the second limit value;
generate a second estimated voltage of the d-axis component based on the first estimated voltage of the d-axis component and the d-axis AC voltage actual value;
generate a second estimated voltage of the q-axis component based on the first estimated voltage of the q-axis component and the q-axis AC voltage actual value;
generate a d-axis differential voltage command value by subtracting the second estimated voltage of the d-axis component from the third limited voltage command value of the d-axis component;
generate a q-axis differential voltage command value by subtracting the second estimated voltage of the q-axis component from the third limited voltage command value of the q-axis component;
generate a limited voltage value based on the d-axis AC voltage actual value, the d-axis differential voltage command value, the q-axis AC voltage actual value, and the q-axis differential voltage command value; and
generate a voltage command value by adding the reference voltage command value and the limited voltage value.

11. The control device for a power converter according to claim 10, wherein
the output voltage is a voltage value of a three phase component or a two phase component, and
the first current command value is a current value of a three phase component or a two phase component, and
the second current actual value is a voltage value of a three phase component or a two phase component, and
the limited voltage value is a voltage value of three phase component or two phase component, and
the reference voltage command value is a voltage value of three phase component or two phase component.

12. The control device for a power converter according to claim 10, wherein
the first current command value is a current command value obtained by coordinate conversion of the d-axis current command value and the q-axis current command value into three phase component.

13. The control device for a power converter according to claim 10, wherein
the first estimated voltage of the d-axis component is an estimated value of a reference voltage command value of the d-axis component obtained when the reference voltage command value is coordinate-converted into dq component, and
the first estimated voltage of the q-axis component is an estimated value of a reference voltage command value of the q-axis component obtained when the reference voltage command value is coordinate-converted into dq component.

14. The control device for a power converter according to claim 10, wherein
in a process of generating the first limit value, the control device is configured to:
generate a square root of a sum of a square of the first estimated voltage of the d-axis component and a square of the first estimated voltage of the q-axis component;
calculate a ratio value of the square root to a reference absolute value by dividing the square root by the reference absolute value; and
determine the first limit value according to the ratio value.

15. The control device for a power converter according to claim 10, wherein
in a process of generating the second limit value, the control device is configured to:
generate a square root of a sum of a square of the second limit voltage command value of the d-axis component and a square of the second limit voltage command value of the q-axis component;
calculate a ratio value of the square root to a reference absolute value by dividing the square root by the reference absolute value; and
determine the second limit value according to the ratio value.

16. The control device for a power converter according to claim 10, wherein
in a process of generating the first limit value, the control device is configured to:
generate a square root of a sum of a square of an estimated voltage of a d-axis low-frequency element obtained by applying a low pass filter to the first estimated voltage of the d-axis element and a square of an estimated voltage of a q-axis low-frequency element obtained by applying a low pass filter to the first estimated voltage of the q-axis element;
calculate a ratio value of the square root to a reference absolute value by dividing the square root by the reference absolute value; and
determine the first limit value according to the ratio value.

17. The control device for a power converter according to claim 10, wherein
in a process of generating the limited voltage value, the control device is configured to:
generate a first voltage by subtracting the d-axis AC voltage actual value from the d-axis differential voltage command value;
generate a second voltage by subtracting the q-axis AC voltage actual value from the q-axis differential voltage command value;
generate the limited voltage value obtained by coordinate-converting the first voltage and the second voltage into three phase component.

18. The control device for a power converter according to claim 10, wherein
in a process of generating the limited voltage value, the control device is configured to:
generate an AC voltage actual value of a d-axis frequency component by applying a low pass filter to the d-axis AC voltage actual value;
generating an AC voltage actual value of q-axis frequency component by applying a low pass filter to the q-axis AC voltage actual value;
generate a first voltage by subtracting the AC voltage actual value of the d-axis frequency component from the d-axis differential voltage command value;
generate a second voltage by subtracting the AC voltage actual value of the q-axis frequency component from the q-axis differential voltage command value; and
generate the limited voltage value obtained by coordinate-converting the first voltage and the second voltage into three phase component.

19. The control device for a power converter according to claim 10, wherein
the second limit voltage command value of the d-axis component is a voltage value obtained by adding the first limited voltage command value of the d-axis component and the d-axis AC voltage actual value, and
the second limit voltage command value of the q-axis component is a voltage value obtained by adding the first limited voltage command value of the q-axis component and the q-axis AC voltage actual value, and
the second estimated voltage of the d-axis component is a voltage value obtained by adding the first estimated voltage of the d-axis component and the d-axis AC voltage actual value, and
the second estimated voltage of the q-axis component is a voltage value obtained by adding the first estimated voltage of the q-axis component and the q-axis AC voltage actual value.

20. The control device for a power converter according to claim 10, wherein
the second limit voltage command value is a voltage value obtained by adding the first limited voltage command value and an AC voltage actual value of a d-axis frequency component obtained by applying a low pass filter to the d-axis AC voltage actual value, and
the second limit voltage command value of a q-axis element is a voltage value obtained by adding the first limited voltage command value of the q-axis element and an AC voltage actual value of the q-axis element obtained by applying a low pass filter to the q-axis AC voltage actual value of the q-axis element, and
the second estimated voltage of a d-axis element is a voltage value obtained by adding the first estimated voltage of the d-axis element and the AC voltage actual value of a d-axis AC voltage obtained by applying a low pass filter to the d-axis AC voltage actual value, and
the second estimated voltage of the q-axis element is a voltage value obtained by adding the first estimated voltage of the q-axis element and the AC voltage actual value of a q-axis AC voltage obtained by applying a low pass filter to the q-axis AC voltage actual value.

* * * * *